(12) United States Patent
Peters

(10) Patent No.: US 12,392,725 B2
(45) Date of Patent: Aug. 19, 2025

(54) SPARK STAND ASSEMBLY FOR AN OPTICAL EMISSION SPECTROSCOPY INSTRUMENT

(71) Applicant: Hitachi High-Tech Analytical Science GmbH, Uedem (DE)

(72) Inventor: André Peters, Kleve-Warbeyen (DE)

(73) Assignee: HITACHI HIGH-TECH ANALYTICAL SCIENCE GMBH, Uedem (DE)

( * ) Notice: Subject to any disclaimer, the term of this patent is extended or adjusted under 35 U.S.C. 154(b) by 125 days.

(21) Appl. No.: 18/343,461

(22) Filed: Jun. 28, 2023

(65) Prior Publication Data

US 2024/0003817 A1  Jan. 4, 2024

(30) Foreign Application Priority Data

Jul. 1, 2022  (EP) ..................................... 22182557

(51) Int. Cl.
*G01N 21/73* (2006.01)
*G01J 3/443* (2006.01)
*G01N 21/67* (2006.01)

(52) U.S. Cl.
CPC .............. *G01N 21/73* (2013.01); *G01J 3/443* (2013.01); *G01N 21/67* (2013.01)

(58) Field of Classification Search
CPC .......... G01N 21/73; G01N 21/67; G01J 3/443
See application file for complete search history.

(56) References Cited

U.S. PATENT DOCUMENTS

2018/0292259 A1  10/2018  Leoni et al.
2021/0285820 A1*  9/2021  Dominick ................. G01J 3/10
2022/0333990 A1*  10/2022  Demarco ................. H05H 1/48

FOREIGN PATENT DOCUMENTS

DE           2833324 A1    2/1980
EP           0348375 A2    12/1989
WO      2021048382 A2    3/2021

OTHER PUBLICATIONS

Search Report for EP Application No. 22 18 2557 dated Dec. 5, 2022, 2 pages.

* cited by examiner

*Primary Examiner* — Jamil Ahmed
(74) *Attorney, Agent, or Firm* — NIXON & VANDERHYE

(57) ABSTRACT

A spark stand assembly for an optical emission spectroscopy includes: a spark stand body on a mounting flange enabling attaching the assembly to a main housing; an exciter in a recess on the body; an elevated portion on the body adjacent the mounting flange; an elongated notch on the body connecting the recess to a passageway through the elevated portion; a spark stand plate on the body to cover the recess, the notch and part of the elevated portion so the recess forms a plasma chamber and the notch forms a path to the passageway. The plate includes an opening exposing part of a sample on the opening for excitation, the opening being spatially aligned with the exciter when the plate is on the body; and a sealing member between the top of the body and the plate enclosing the recess and notch and routed over the elevated portion.

20 Claims, 7 Drawing Sheets

SPARK STAND ASSEMBLY FOR AN OPTICAL EMISSION SPECTROSCOPY INSTRUMENT

CROSS-REFERENCE TO RELATED APPLICATIONS

This application claims the priority under 35 USC 119(a) of EP patent application 22182557.3 filed on Jul. 1, 2022, the entirety of which is incorporated herein by reference.

BACKGROUND OF THE INVENTION

Field of the Invention

The example and non-limiting embodiments of the present invention relate to optical emission spectroscopy instruments and, in particular, to a spark stand assembly for such an instrument.

Description of the Related Art

Analyzer instruments that are applicable for analysis of material such as metals at high accuracy typically rely on optical emission spectroscopy (OES) techniques. Analyzer instruments that rely on spark OES technique(s) find use in laboratories as well as in industry where accurate and reliable material analysis is important. High-performance spark OES instruments intended for professional industrial applications are complex apparatuses that are typically provided as desktop (or benchtop) devices or mobile devices provided with wheels or mounted on a wheeled trolley that is tailored for transporting the analyzer instrument.

A basic operating principle of an OES technique involves exciting a sample using a suitable excitation means in order to transform a fraction of the sample into a plasma state and transmitting light emitted from transitions between energy levels of excited atoms or ions of the plasma to a spectrometer for analysis of elemental composition of the sample via comparison of the captured sample spectrum to respective reference spectra of one or more samples of known elemental composition. Various means of excitation are known in the art, such as arc, spark, laser, inductively coupled plasma (ICP) and direct-current plasma (DCP), where the type of excitation is in many cases applied to designate the respective OES technique, e.g. spark OES or laser-induced breakdown spectroscopy (LIBS).

Depending on the wavelength range to be covered by the optical system of an OES instrument, an ultraviolet (UV) transmissive atmosphere may be necessary within the optical system and along the path of transmission from a spot of plasma generation to the spectrometer interface. The atmosphere, particularly at and near the spot of plasma generation, usually includes an inert gas such as argon, which facilitates plasma generation and prevents formation of undesired substances such as oxides, carbides and nitrides that are likely to form if generating plasma in ambient air.

Due to this requirement of specific atmosphere at and near the spot of plasma generation, an OES instrument typically includes a plasma chamber provided with an opening for exposing the spot of the sample placed against the opening for the excitation, whereas arranging the sample on the opening typically seals the plasma chamber in a gas-tight manner. The plasma chamber further includes excitation means for exciting the exposed spot of the sample, gas-inlet(s) to allow for injecting the inert gas into the chamber to purge the spot of plasma generation and draining outlet(s) for removing the inert gas and any debris formed during plasma generation out of the plasma chamber. The plasma chamber is further provided with an (optical) window for transmitting light emitted from the plasma out of the plasma chamber and to the spectrometer. In an OES instrument that makes use of the spark excitation (i.e. in a spark OES instrument) the plasma chamber may be also referred to as a spark chamber.

Without losing generality, an element of an OES instrument that includes the plasma chamber (e.g. the spark chamber) may be referred to as a spark stand. The spark stand typically further comprises the excitation means, gas-injection means for injecting the inert gas into the plasma chamber via the gas-inlet(s), draining means for transferring the inert gas and debris out of the plasma chamber via the draining outlet(s) and a path of transmission for transferring the light emitted from the plasma via the optical window of the plasma chamber towards the spectrometer. The opening to the plasma chamber is typically provided as an opening through a housing of the spark stand and, consequently, the sample may be provided for measurement by placing it against the opening through the housing of the spark stand.

The spark stand may be provided as an element that is separate from a main housing of the OES instrument that includes e.g. the spectrometer, where the spark stand may be mounted to the main housing in a fixed manner or it may be detachably attachable to the main housing. The latter approach allows an approach where the spark stand may be mounted to the main housing of the OES instrument for carrying out a measurement of a sample and it may be dismounted from the main housing for cleaning and/or maintenance. Regardless of the type of attachment of the spark stand to the main housing of the OES instrument (fixed or detachable), the spark stand may be provided with a mounting flange that serves as an 'interface' between the spark stand and the main housing of the OES instrument, where the path of transmission provided in the spark stand couples through the mounting flange to a path of transmission provided in the main housing and further to the spectrometer provided within the main housing. Moreover, electrical couplings to the main housing of the OES instrument that may be necessary for operation of some components of the spark stand may be likewise routed through the mounting flange.

Important characteristics of the spark stand include secure and robust manner of ensuring gas-tightness of the plasma chamber provided therein and controlled transmission of the light from the plasma generated in the plasma chamber via the path of transmission therein towards the spectrometer and, consequently, any improvement in this regard is helpful in further improving accuracy and reliability of analysis of elemental composition of samples via operation of the OES instrument making use of the spark stand.

SUMMARY OF THE INVENTION

It is an object of the present invention to provide a spark stand assembly that facilitates a secure and robust manner of ensuring gas-tightness of the plasma chamber. Additionally or alternatively, it is an object of the present invention to provide a spark stand assembly that facilitates controlled transmission of the light from the plasma generated in the plasma chamber towards the spectrometer.

According to an example embodiment, a spark stand assembly for an optical emission spectroscopy, OES, instrument is provided, the spark stand assembly comprising: a spark stand body attached to a mounting flange that enables attaching the spark stand assembly to a main housing of the OES instrument; an exciter disposed into a recess arranged on a top surface of the spark stand body; an elevated portion arranged on the top surface of the spark stand body adjacent to the mounting flange; an elongated notch arranged on the top surface of the spark stand body and connecting said recess to a passageway through the elevated portion; a spark stand plate that is detachably attachable on the top surface of the spark stand body to cover said recess, said notch and at least part of the elevated portion such that said recess forms a plasma chamber and said notch forms a part of an optical transmission path from the plasma chamber to said passageway, wherein the spark stand plate comprises an opening therethrough for exposing a part of a sample positioned on the opening for excitation from the exciter, said opening positioned such that said opening is spatially aligned with the exciter when the spark stand plate is attached on the top surface of the spark stand body; and a sealing member arranged between the top surface of the spark stand body and the spark stand plate such that it encloses said recess and said notch and is routed over the elevated portion.

In an example, a sealing member groove is arranged on the top surface of the spark stand body and on the elevated portion such that it encloses said recess and said notch, wherein the sealing member is at least partially embedded into the sealing member groove. In another example, a sealing member groove is arranged on a spark-stand-body-facing surface of the spark stand plate, wherein the sealing member is at least partially embedded into the sealing member groove and wherein the sealing member groove is positioned such that the sealing member encloses said recess and said notch and is routed over the elevated portion when the spark stand plate is attached on the top surface of the spark stand body.

According to another example embodiment, an OES instrument comprising a main housing and a spark stand assembly according to the example embodiment described in the foregoing is provided, wherein the main housing comprises an optical spectrometer assembly and a mounting interface for attaching the spark stand assembly to the main housing, and the mounting interface comprises an optical interface for connecting said optical transmission path of the spark stand assembly to the spectrometer assembly.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF THE DRAWINGS

The embodiments of the invention are illustrated by way of example, and not by way of limitation, in the figures of the accompanying drawings, where FIG. 1 schematically illustrates an optical emission spectroscopy (OES) instrument according to an example.

DETAILED DESCRIPTION

Figure 1:
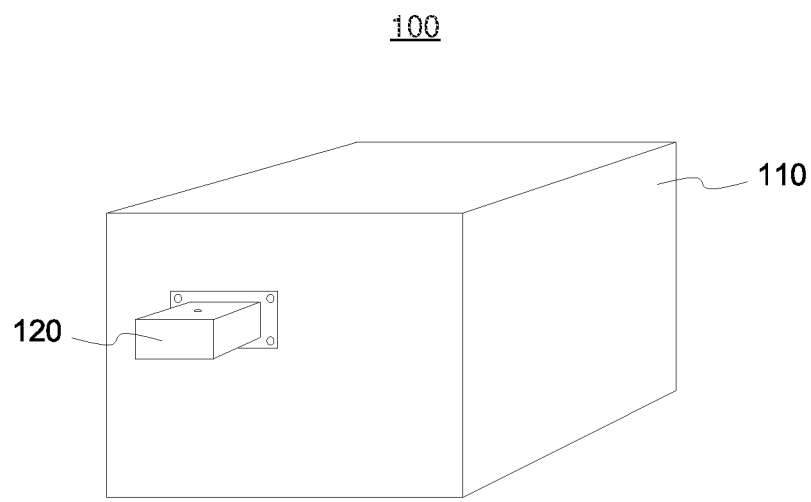
Figure 2:
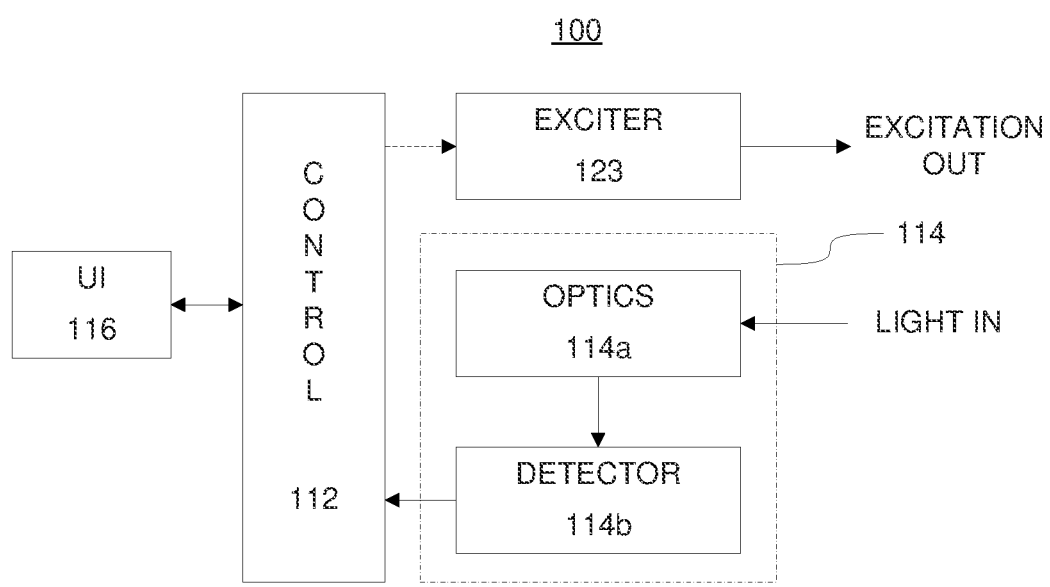
FIG. 2 illustrates a block diagram of some elements of an OES instrument according to an example.

FIG. 1 schematically illustrates an OES instrument 100 according to an example, including a main housing 110 of the OES instrument 100 and a spark stand assembly 120 mounted to the main housing 110. The spark stand assembly 120 may be mounted to the main housing 110 for carrying out measurements for one or more samples and it may be unmounted from the main housing 110 for cleaning and/or maintenance. In other words, the spark stand assembly 120 is detachably attachable to the main housing 110. FIG. 2 illustrates a block diagram of some (logical) elements of the OES instrument 100 according to an example, including a controller 112, an exciter 123, an optical spectrometer assembly 114 and a user interface (UI) 116. The OES instrument may be suitable for analysis of any samples having a conductive surface, such as samples comprising or consisting of metal(s).

The main housing 110 serves to accommodate one or more components of the OES instrument 100 and the main housing 110 may further comprise e.g. storage space for accessories and/or materials that may be applicable for operating the OES instrument 100. In this regard, the main housing 110 may include a mounting interface for mounting the spark stand assembly 120, which enables mechanical attachment between the spark stand assembly 120 and the main housing 110 and provides optical and electrical interfaces between components of the spark stand assembly 120 and components provided in or coupled to the main housing 110. The main housing 110 may comprise (or have coupled thereto) the UI 116 for operating at least some aspects of the OES instrument 100, where the UI 116 may comprise one or more user input devices (such as a keyboard, a mouse, a touch panel, a touch screen, an arrangement of one or more keys, buttons, switches, etc.) for providing user input for controlling various aspects related to operation of the OES instrument 100 and a display apparatus for displaying information such as information regarding operational status of the OES instrument 100 and measurement results to a user. The OES instrument 100 may enable analysis of elemental composition of a sample using one or more OES techniques, such as spark OES and/or arc OES.

The main housing 110 further comprises the optical spectrometer assembly 114 including spectrometer optics 114a and a light detector assembly 114b, whereas the main housing 110 further provides a first transmission path that optically couples the optical interface of the mounting interface to the spectrometer optics 114a of the optical spectrometer assembly 114, the first transmission path hence enabling transfer of light received from the spark stand assembly 120 via the optical interface of the mounting interface to the optical spectrometer assembly 114. The spectrometer optics 114a may disperse the light received via the optical interface into a set of wavelengths, whereas the light detector assembly 114b may generate one or more measurement signals that are descriptive of relative light intensities of the dispersed light emission at different wavelengths, which may appear e.g. as one or more emission peaks at respective wavelengths. As an example in this regard, the light detector assembly 114b may comprise a light detector array including a plurality of light detectors, such as an arrangement of photomultiplier tubes mounted behind respective rectangular apertures that allow for only a narrow wavelength band to pass through. According to another example, the light detector assembly 114b may comprise an image sensor, where the image sensor may be provided as a charge-coupled device (CCD), as a complementary metal-oxide-semiconductor (CMOS) sensor or, in general, as any (silicon-based) solid state sensor, the light detector assembly 114b thereby substantially capturing one or more images of dispersed light received from the spectrometer optics 114a.

The main housing 110 may further comprise the controller 112 that is communicatively coupled to the UI 116 and to the detector assembly 114b of the optical spectrometer assembly 114 to enable transfer of control information and data (such as measurement results) between the controller 112 and the UI 116 and to enable the controller 112 receiving the one or more measurement signals from the light detector assembly 114b. The controller 112 may be further communicatively coupled to the electrical interface of the mounting interface, which enables electrical coupling to the exciter 123 provided in the spark stand assembly 120 when it is mounted to the main housing 110 via the mounting interface, thereby allowing for activation of the exciter 123 via operation of the controller 112. The respective communicative couplings between the controller 112 and the UI 116 as well as between the controller 112 and the electrical interface of the mounting interface may be provided using respective electrical signals conveyed e.g. via respective one or more electrical wires.

As a particular example of operation of the OES instrument 100, the controller 112 may conduct a measurement procedure to determine at least some aspects of elemental composition of a sample under study, where the measurement procedure may be carried out in response to a trigger signal that may be received in response to a user operating the UI 116 accordingly. The measurement procedure may involve the controller 112 activating the exciter 123 for a predefined time period to generate an excitation that results in transforming a fraction of the sample under study into the plasma state, recording the one or more measurement signals generated at the light detector assembly in response to the light emitted from the plasma and received at the light detector assembly 114b via the spectrometer optics 114a, and carrying out an analysis of elemental composition of the sample under study based on the recorded one or more measurement signals (e.g. via comparison to respective reference spectra of one or more samples of known elemental composition). The measurement procedure of a kind described above is well known in the art and it is outlined herein for the sake of completeness of the description.

Figure 3A:
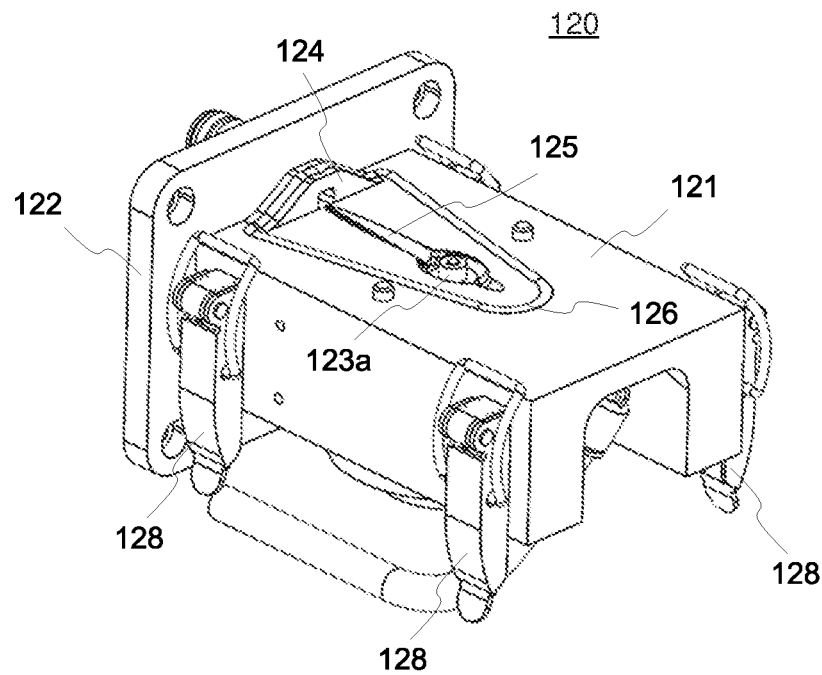
FIG. 3A schematically illustrates a spark stand assembly according to an example.
Figure 3B:
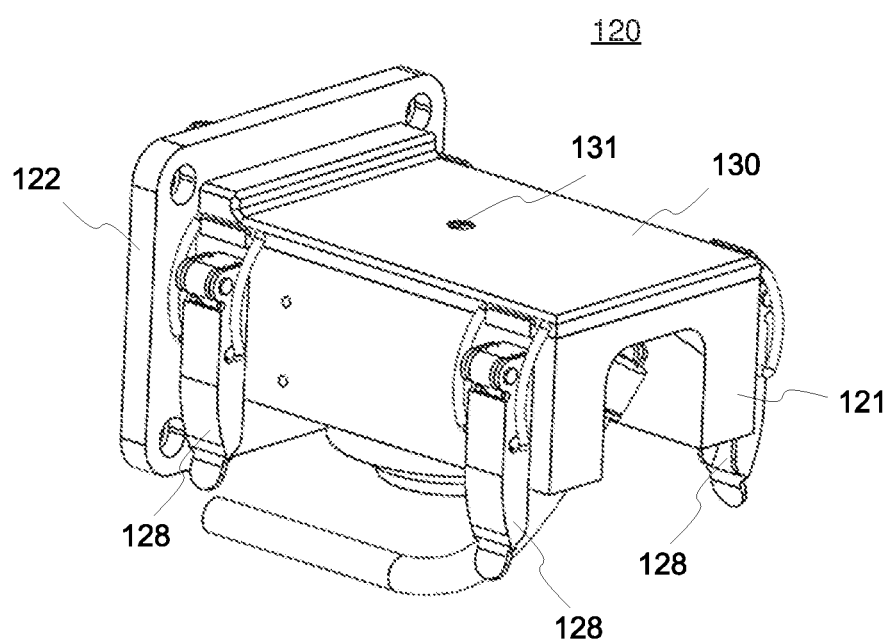
FIG. 3B schematically illustrates a spark stand assembly according to an example.
Figure 3C:
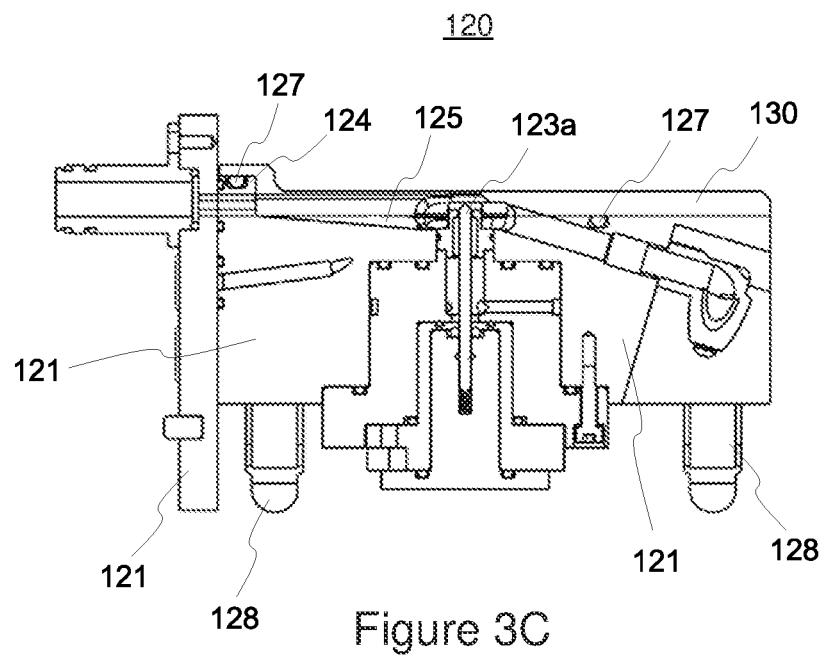
FIG. 3C schematically illustrates a spark stand assembly according to an example.

FIGS. 3A to 3C schematically illustrate some components of the spark stand assembly 120 according to an example. Components illustrated in FIG. 3A include a spark stand body 121 attached to a mounting flange 122, an electrode 123a serving as the exciter 123 arranged in a recess formed on a top surface of the body 121, an elevated portion 124 arranged on the top surface of the body 121 adjacent to the mounting flange 122, an elongated notch 125 arranged on the top surface of the spark stand body 121, the elongated notch 125 connecting the recess to a passageway through the elevated portion 124, and a sealing member groove 126 arranged on the top surface of the spark stand body 121, the sealing member groove 126 enclosing (e.g. surrounding) the recess and routed on the elevated portion 124. The mounting flange 122 is provided with an opening therethrough, which opening is aligned with the passageway through the elevated portion 124 and the elongated notch 125. The sealing member groove 126 is arranged for receiving a sealing member 127 (not shown in the illustration of FIG. 3A but shown in the illustration of FIG. 3C), such as a sealing ring (e.g. an O-ring) made of elastic material. The spark stand assembly 120 may further comprise the sealing member 127 at least partially embedded into the sealing member groove 126. The cross-section of the sealing member groove 126 may have a shape that facilitates keeping the sealing member 127 placed therein in its position.

The top surface of the spark stand body 121 is arranged for reception of a spark stand plate 130 that covers at least the recess, the elongated notch 125 and (at least part of) the elevated portion 124. As an example in this regard, the illustration of FIG. 3B shows a schematic perspective view to spark stand assembly 120 where the spark stand plate 130 is attached to cover the top surface of the spark stand body 121, whereas FIG. 3C shows a cross-section of the spark stand assembly 121 with the spark stand plate 130 attached to cover the top surface of the spark stand body 121. The spark stand plate 130 is detachably attachable on the top surface of the spark stand body 121 via usage of an attachment mechanism provided for holding (e.g. pressing) the spark stand plate 130 against the top surface of the spark stand body 121, which is represented in the respective illustrations of FIGS. 3A to 3C by a set of clamps 128 that enable securing the spark stand plate 130 on the top surface of the spark stand body 121 and releasing the spark stand plate 130 from the spark stand body 121.

When attached on the top surface of the spark stand body 121, the spark stand plate 130 covers the recess such that a plasma chamber is formed and it covers the notch 125 such that a second transmission path is formed, where the second transmission path provides a view to the plasma (to be) generated in the plasma chamber from the opening through the mounting flange 122, the second transmission path hence enables transmitting light from the plasma via the notch 125, via the passageway through the elevated portion 124 and further via the opening through the mounting flange 122 to the optical interface of the mounting interface provided in the main housing 110. In this regard, the surface of the spark stand plate 130 that is intended for facing the top surface of the spark stand body 121 may be referred to as an inner surface or as a spark-stand-body-facing surface, whereas the opposite surface of the spark stand plate 130 may be referred to as an outer surface. The inner surface of the spark stand plate 130 may have a shape that substantially follows the shape of the top surface of the spark stand body 121 apart from the recess and the notch 125 arranged therein. As an example in this regard, the top surface of the spark stand body 121 may be substantially planar apart from the recess, the notch 125 and the sealing member groove 126 arranged therein and the elevated portion 124 arranged thereon, whereas the inner surface of the spark stand plate 130 may be substantially planar apart from a portion that is intended for abutting the elevated portion 124 on the top surface of the spark stand body 121. Hence, the portion of the spark stand plate 130 intended for facing the elevated portion 124 on the top surface of the spark stand body 121 may have shape that substantially follows the shape of the elevated portion 124, thereby accommodating the elevated portion 124 when the spark stand plate 130 is correctly positioned against the top surface of the spark stand body 121.

The spark stand plate 130 is provided with an opening 131 therethrough, which opening 131 is substantially spatially aligned with the electrode 123a when the spark stand plate 130 is secured to its position on the top surface of the spark stand body 121. In this regard, the spatial alignment means that a projection of the opening 131 along a line that is perpendicular to the surfaces of the spark stand plate 130 encompasses a tip of the electrode, e.g. such that the tip of the electrode resides substantially at the center of the projection. Moreover, when the spark stand plate 130 is secured to its position on the top surface of the spark stand body 121, the sealing member 127 facilitates sealing the recess arranged into the spark stand body 121 and the notch 125 in a gas-tight manner apart from the opening 131 through the spark stand plate 130, thereby forming the plasma chamber and the optical path described in the foregoing.

Figure 4:
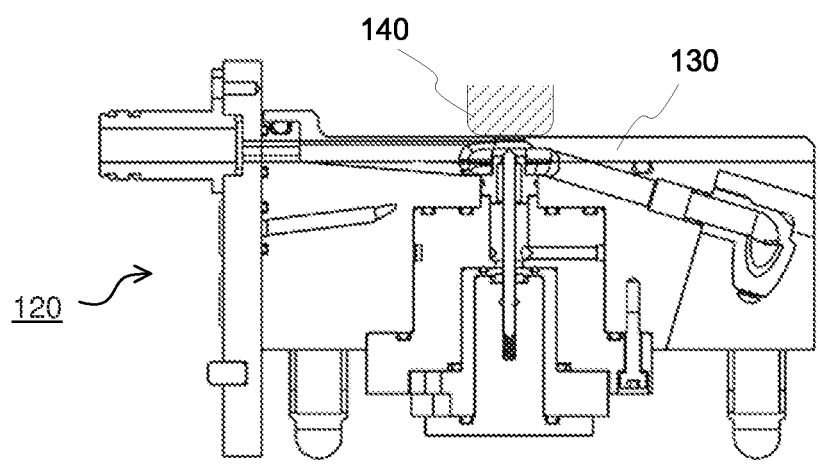
FIG. 4 schematically illustrates a sample arranged for measurement via usage of a spark stand assembly according to an example.

When operating the spark stand assembly 120 as part of operation of the OES instrument 100, a sample 140 may be positioned on the spark stand plate 130 such that sample 140 covers the opening 131, as schematically illustrated in FIG. 4. In this regard, the sample 140 positioned on the opening 131 seals the plasma chamber in a gas-tight manner while exposing a portion of the sample 140 at the location of the opening 131 for producing excitation via activation of the electrode 123a, thereby enabling generation of plasma on the surface of the sample 140 via activation of the electrode 123a. The gas-tight sealing may be facilitated by suitable preparation of the sample 140 (such as grinding or milling) and/or by positioning the sample 140 on the opening via application of an adaptor element that ensures sealing of the opening 131 and/or correct positioning of the sample 140 with respect to the opening 131. The gas-tight sealing of the plasma chamber during the measurement procedure is advantageous in terms of reliability and repeatability of measurements in general, whereas it may be a crucial characteristic for the measurement procedure in order to detect certain elements, such as nitrogen or oxygen as well as for measurements where the UV transmissive atmosphere is created via injecting inert gas (such as argon) to the plasma chamber.

As described in the foregoing, when covered by the spark stand plate 130, the elongated notch 125 on the top surface of the spark stand body 121 serves as part of the second transmission path that is routed via the passageway through the elevated portion 124. Hence, the elevated portion 124 that is positioned adjacent to the mounting flange 122 and provided with the passageway therethrough may be considered as a bridge structure arranged on the top surface of the spark stand body 121. When the spark stand assembly 120 is mounted to the main housing 110, the second transmission path provided in the spark stand assembly 120 is aligned with the first transmission path provided in the main housing 110, thereby forming a path of transmission that allows for transmitting the light emitted from the plasma to the spectrometer assembly 114 substantially along a plane that is parallel to the top surface of the spark stand body 121 and the inner surface of the spark stand plate 130, thereby providing a substantially 0° (i.e. zero-degree) viewing angle to the plasma.

The elongated notch 125 arranged in the top surface of the spark stand body 121 may have a depth that varies with the distance from the recess that forms the plasma chamber when the spark stand plate 130 is arranged on the top surface of the spark stand body 121. As an example in this regard, the depth of the notch 125 may steadily decrease from a first end of the notch 125 at the recess to a second end of the notch 125 at the passageway through the elevated portion 124, where the bottom of the notch 125 at its first end may be substantially aligned with the bottom of the recess. Such a shape of the notch 125 facilitates removing any contamination and/or debris generated in the course of measurements from the notch 125 and/or from the recess via injecting a stream of inert gas. According to an example, the cross-section of the notch may have shape that gets narrower towards the bottom of the notch 125 (e.g. a u-shape or a v-shape), which may likewise facilitate removal of the contamination and/or debris from the notch 125 and/or from the recess via injecting a stream of inert gas.

The path of transmission may comprise a window or a coupling lens arranged such that the view from the spectrometer assembly 114 to the plasma is provided through the window or the coupling lens. In the following, this aspect is described via an example that involves the coupling lens arranged in the path of transmission, while the description readily applies to another example where the window is applied instead, mutatis mutandis. The coupling lens may be disposed in a chosen position along the path of transmission from the plasma chamber to an entrance aperture to the spectrometer optics 114a, for example in a suitable position within the first transmission path or within the second transmission path (e.g. within the passageway through the elevated portion 124), in the optical interface of the mounting interface (in the main housing 110) or in the opening through the mounting flange 122. The coupling lens may serve to form an image of the plasma in a selection position with respect to the entrance aperture to the spectrometer optics 114a (e.g. within the spectrometer optics 114a, at the entrance aperture to the spectrometer optics 114a, or in the first transmission path) and to isolate at least part of the path of transmission—and hence the spectrometer assembly 114—from the plasma chamber to prevent any contamination and/or debris formed due to generation of the plasma during measurements entering the spectrometer assembly 114. Characteristics and/or position of the coupling lens (along the path of transmission) may be chosen e.g. in view of respective characteristics and dimensions of the first transmission path, the second transmission path and the spectrometer assembly 114. Typically, it is advantageous to dispose the coupling lens as far as possible from the plasma chamber to reduce the amount of contamination and/or debris meeting the plasma-chamber-facing surface of the coupling lens.

Usage of the spark stand plate 130 that is detachably attachable to the spark stand body 121 is advantageous in that it allows for exposing the plasma chamber and the notch 125 for cleaning between measurements in order to remove the debris and/or contamination that necessarily accumulates e.g. on respective surfaces of the plasma chamber, the notch 125 and the coupling lens in the course of measurements carried out via usage of the spark stand assembly 120.

The mounting flange 122 enables mounting of the spark stand assembly 120 to the main housing 110 of the OES instrument 100 via the mounting interface provided in the main housing 110 in a detachable manner, i.e. such that the user may dismount the spark stand assembly 120 from the main housing 110 for maintenance and cleaning and (re-)mount the spark stand assembly 120 to the main housing 110 for subsequent measurements. In this regard, the mounting flange 122 and/or the mounting interface in the main housing 110 may be provided with user-operable mounting mechanism that allows for securing the spark stand assembly 120 to the main housing 110 such that a correct spatial alignment between the spark stand assembly 120 and the main housing 110 is provided and that allows for releasing the spark stand assembly 120 from the main housing. In this regard, the term mounting flange 122 is to be construed broadly, encompassing basically any 'interfacing element' that is detachably attachable to the mounting interface of the main housing 110 of the OES instrument 100.

The spark stand body 121 and the spark stand plate 130 may be made of durable material that is able to withstand the heat resulting from the plasma generated in the plasma chamber. Examples of suitable materials include metals such as stainless steel (e.g. EN 1.4305, EN 1.4301, EN 1.0050, EN 1.0760 or EN 2.0376). The spark stand body 121 is attached to the mounting flange 122 such that the top surface of the spark stand body 121 is positioned substantially horizontally when the spark stand assembly 110 is mounted to the main housing 110 of the OES instrument 100 when the OES instrument 100 is in its operating position. Typically, but not necessarily, the mounting flange 122 is made of the same or similar material as the spark stand body 121.

In the example making use of the electrode 123a as the exciter 123 in the example of FIGS. 3A to 3C may be applied to generate spark excitation under control of the controller 112, whereas in other examples the exciter 123 may apply another excitation technique known in the art for plasma generation. The electrode 123a may be positioned with respect to the spark stand body 121 such that a tip of the electrode 123a resides inside the plasma chamber formed between the recess arranged on the top surface of the spark stand body 121 and the spark stand plate 130 arranged thereon, whereas the remaining part of the electrode 123a may be embedded into the spark stand body 121. In this regard, the electrode 123a may be mounted to the spark stand body 121 via an insulation arrangement (e.g. an insulator sleeve) that may be made of suitable ceramic material. As an example in this regard, the insulation arrangement may comprise a sheath made of ceramic material that surrounds the electrode 123a such that the tip of the electrode 123a is exposed in the recess provided in the top surface of the spark stand body 121, whereas an 'upper' end of the sheath may serve as a 'bottom' of the recess that forms the plasma chamber. In other words, the tip of the electrode 123a may be brought to the recess that forms the plasma chamber via an opening provided in the insulation arrangement.

Figure 5:
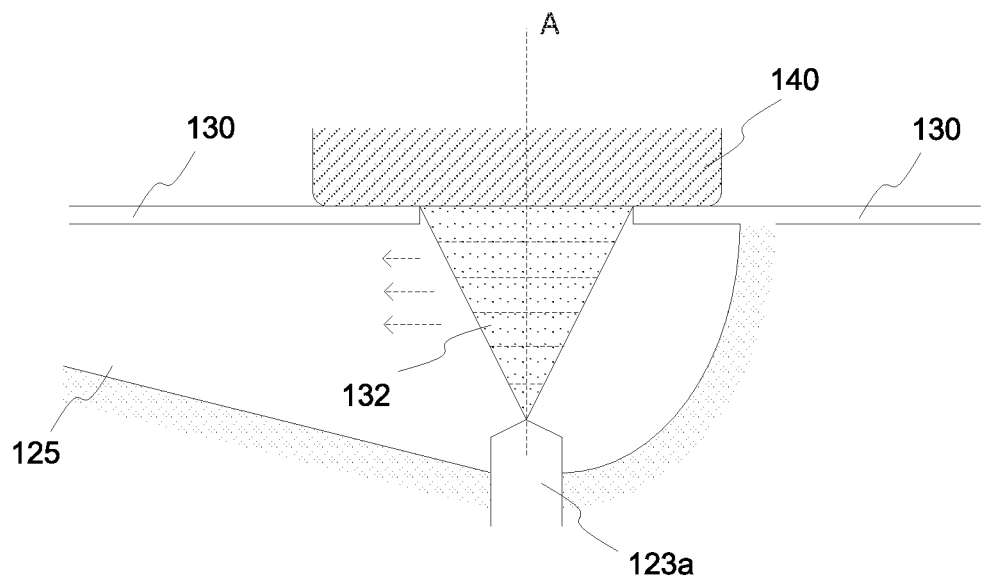
FIG. 5 schematically illustrates some details of a spark stand assembly according to an example.

When the electrode 123a is activated to generate the plasma on the surface of the sample 140 exposed via the opening 131 through the spark stand plate 130, the generated plasma is formed between the tip of the electrode 123a and the surface of the sample 140. In this regard, FIG. 5 schematically illustrates a cross-section of selected details of the spark stand assembly 120 according to an example, also showing a plasma cone 132 that is formed upon activation of the electrode 123a between the tip of the electrode 123a and the surface of the sample 140 exposed via the opening 131 through the spark stand plate 130. Consequently, the light emitted from the plasma cone 132 is transmitted via the second transmission path formed within the spark stand assembly 120 towards the opening through the mounting flange 122 and further via the first transmission path within the main housing 110 to the spectrometer assembly 114.

The gas-tight sealing of the notch 125 and the recess on the top surface of the spark stand body 121 via arrangement of the spark stand plate 130 thereon may be ensured via the sealing member 127 that may be at least partially embedded into the sealing member groove 126 when the spark stand plate 130 is pressed against the top surface of the spark stand body 121 by the attachment mechanism such as the set of clamps 128. In this regard, routing of the sealing member groove 126—and hence the sealing member 127—over the bridge structure formed by the elevated portion 124 provides an arrangement, where pressing the spark stand plate 130 against the top surface of the spark stand body 121 is sufficient to ensure gas-tight sealing of both the plasma chamber and the notch 125 that serves as part of the second transmission path from the plasma chamber towards the optical interface of the mounting interface in the main housing 110 of the OES instrument 100. In contrast, in previously known solutions respective separate sealing rings are typically applied between a first surface of a spark stand plate and the top surface of a spark stand body to seal the plasma chamber and between a second surface of the spark stand plate 121 (that is substantially perpendicular to the first surface) and a mounting flange to seal the optical path from the plasma chamber towards the optical interface of the mounting interface, thereby requiring separately sealing the spark stand plate against two surfaces that are substantially perpendicular to each other. This, in turn, requires correct positioning of the spark stand plate in two directions that are substantially perpendicular to each other, which is a cumbersome procedure that runs a risk of compromised sealing and it may also subject the sealing rings to abrasion and breakage over repeated attachment and detachment of the spark stand plate.

Along the lines described in the foregoing, according to an example, the inner surface of the spark stand plate 130 may be substantially planar, apart from the portion that is intended for abutting the elevated portion 124 when the spark stand plate 130 is attached on the spark stand body 121. Consequently, the second transmission path from the plasma cone 132 towards the opening through the mounting flange 122 is inherently partially obstructed due to non-zero thickness of a portion of the spark stand plate 130 that covers the notch 125 when the spark stand plate 130 is positioned on the top surface of the spark stand body 121, as also shown in the schematic illustration of FIG. 5. Conversely, the non-zero thickness of the spark stand plate 130 results in partially obstructing the view to a small portion of the plasma cone 132 from the opening through the mounting flange 122, which may be referred to as inherent masking provided by (the non-zero thickness of) the spark stand plate 130. Nevertheless, due to relatively small thickness of the spark stand plate 130, such an arrangement allows for transmission of light emitted from the plasma cone 132 substantially throughout the height of the plasma cone 132 along its center axis (that coincides with the line A shown in FIG. 5) via the second transmission path, via the optical interface of the mounting interface and further via the first transmission path towards the spectrometer assembly 114.

In some scenarios it has proven beneficial to be able to control the view from the spectrometer assembly 114 to a predefined portion of the plasma cone 132 to avoid transmitting light emitted from the respective portion of the plasma cone 132 to the spectrometer assembly 114. In this regard, the volume of the plasma cone 132 provides a good approximation of the available intensity in the plasma cone 132. Geometric properties of the plasma cone 132 are such that the bulk of its volume resides near its base that is immediately adjacent to the sample 140 positioned on the opening 131 through the spark stand plate 130. Hence, a noticeable amount of light emitted from the plasma cone 132 may be masked via masking a relatively small portion of the height of the plasma cone 132. Particularly for substantially 0° viewing angles to the plasma cone 132 such masking may be accomplished via making use of temperature distribution-related properties of the plasma cone 132. In this regard, an aspect of special interest involves the temperature gradient of the plasma along the center axis of the plasma cone 132 (cf. the line A in the illustration of FIG. 5) between the tip of the electrode 123a and the surface of the sample 140 exposed to the excitation via the opening 131 through the plasma stand plate 130. In this regard, a temperature distribution within the plasma cone 132 is illustrated via isotherms (shown as respective dashed lines) that are substantially parallel to the base of the plasma cone 132 (and hence substantially perpendicular to the center axis of the plasma cone 132). The portion of the plasma cone 132 at and close to its base is the hottest area, whereas the temperature of the plasma 132 decreases towards the tip of the plasma cone 132 (and hence towards the tip of the electrode 123a), where the temperature at the base may be (clearly) above 12000 degrees Celsius while the temperature at the tip may be (clearly) below 3400 degrees Celsius. The height of the plasma cone 132 is substantially equal to the distance between the tip of the electrode 123a and the outer surface of the spark stand plate 130 (i.e. the surface of the sample 140 positioned on the outer surface at the location of the opening 131), whereas the diameter of the base of the plasma cone 132 may be substantially equal to the height of the plasma cone 132.

In some scenarios, masking of the hottest portion of the plasma cone 132 may be advantageous in terms of accuracy and reliability of the measurement procedure: ionic spectral lines and thermal background radiation predominantly originates from the hottest portion of the plasma cone 132, which is closest to the surface of the sample 140, because the amount of energy to excite these spectral lines is only available in this portion of the plasma cone 132. Since the ionic spectral lines and thermal background radiation are typically considered as aspects that disturb the analysis carried out by the OES instrument 100, masking of the plasma cone 132 such that light emitted from its hottest portion is prevented from being transmitted via the second transmission path to the spectrometer assembly 114 may be advantageous. Such masking may be especially useful, for example, in measurements that aim at detecting certain elements, such as carbon, phosphor and sulfur in iron or nickel matrices because it enables masking off perturbing, ionized lines originating from the plasma cone 132 volume near the surface of the sample 140, thus removing the spectral interference that would occur without masking, with insufficient masking or via application of plasma viewing angles larger than zero degrees. Excitational parameters applied in activating the electrode 123a may vary from one matrix to another, e.g. such that aluminum alloys require different excitational parameters (e.g. different excitational energies) than steels or titanium alloys due to different melting points of these materials. When a higher excitational energy is provided via the electrode 123a, the temperature distribution within the plasma cone 132 changes as the temperature at the surface of the sample 140 increases with increasing excitational energy, thereby shifting respective positions of the isotherms along the axis A. Therefore, different matrices that require different excitational energies from the electrode 123a also require different amount of masking in order to eliminate perturbing spectral lines that have excitational properties that do not change with the applied excitational energy.

Along the lines described in the foregoing, the inherent masking provided by an arbitrary, relatively small thickness of the rim of the opening 131 through the spark stand plate 130 may not have a substantial effect in terms of obstructing the view to the plasma cone 132, whereas true spatial masking of the plasma cone 132 may be accomplished via providing the spark stand plate 130 with a spatial mask that protrudes from the inner surface of the spark stand plate 130, where the spatial mask is arranged in a portion of the spark stand plate 130 that spatially coincides with the notch 125 when the spark stand plate 130 is secured in its position on the spark stand body 121. Consequently, the spatial mask may be applied to partially block the second transmission path between the plasma chamber and the opening through the mounting flange 122, thereby partially obstructing the view from the spectrometer assembly 114 to the plasma cone 132 (to be) generated in the plasma chamber and, in particular, obstructing the view to the hottest portion of the plasma cone 132 at and close to its base. The extent of spatial masking provided depends on the shape and size of the spatial mask, where the extent of masking may be defined via the height (or the depth) of the spatial mask measured from the outer surface of the spark stand plate 130. The height (or depth) of the spatial mask may be referred to as a masking height (or a masking depth). The masking height (or masking depth) may be defined via a predefined percentage of the distance between the tip of the electrode 123a and the outer surface of the spark stand plate 130. As non-limiting examples, the predefined percentage may be a value chosen from a range from 25% to 70%, e.g. 50%. However, the most appropriate masking height (or masking depth) may be chosen according to the circumstances, e.g. in consideration of the excitational parameters applied in activating the electrode 123a.

According to an example, the excitational parameters may be chosen in dependence of the matrix and/or in dependence of analytical sub-program applied for the measurement. An example in this regard is provided in the difference between the iron matrix (Fe matrix) and aluminum matrix (Al matrix): whereas an optimized set of excitational parameters may be applicable to a relatively wide range of different materials, certain materials may require dedicated excitational parameters due to their metallurgical characteristics. For example when determining the phosphor content in aluminum alloys, such material-dependent characteristics may need to be taken into account since the phosphor line (P line) may be superimposed by a continuous background radiation originating from a volume of the plasma cone 132 that is close to the surface of the sample 140. However, in case of an aluminum matrix sample this volume of the plasma cone 132 extends further away from the surface of the sample 140 (along the center axis of the plasma cone 132) than it would for an iron matrix sample and, therefore, a higher extent of spatial masking is required to eliminate the spectral background in case of the aluminum matrix sample than in case of the iron matrix sample.

Figure 6A:
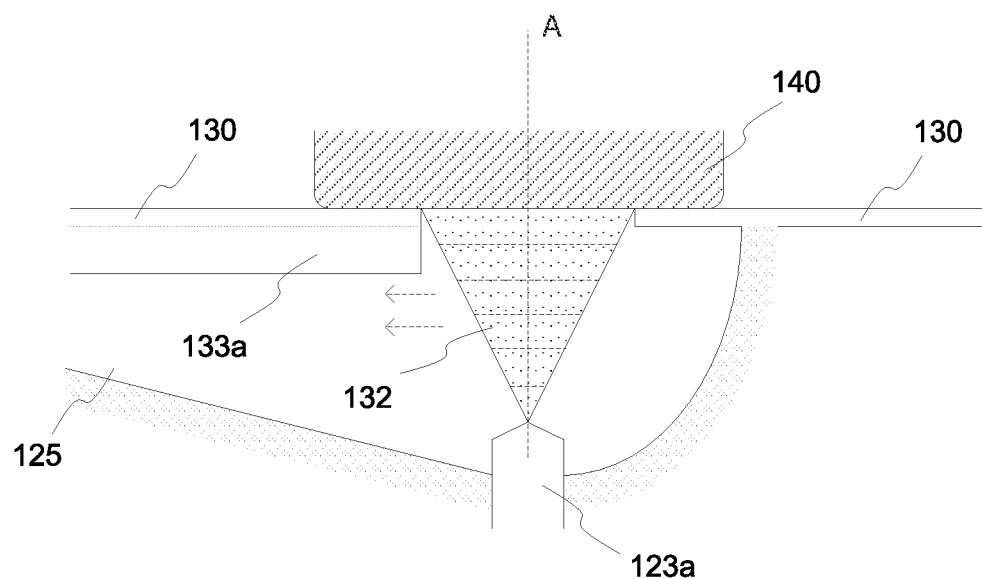
FIG. 6A schematically illustrates some details of a spark stand assembly according to an example.

As an example of providing the spark stand plate 130 with the spatial mask, FIG. 6A schematically illustrates the spark stand plate 130 comprising a masking portion 133a, which is provided as an integral part of the spark stand plate 130 and which serves as the spatial mask. The masking portion 133a may comprise a protrusion that extends from the inner surface of the spark stand plate 130, provided in a portion of the spark stand plate 130 that spatially coincides with the notch 125 when the spark stand plate 130 is secured in its position on the spark stand body 121. In other words, the masking portion 133a may be considered as a thickened portion or as a thickened area in the spark stand plate 130, located in a portion of the spark stand plate 130 that spatially coincides with the notch 125 when the spark stand plate 130 is secured in its position on the spark stand body 121. Consequently, when placing the spark stand plate 130 on the top surface of the spark stand body 121, the masking portion 133a may protrude into the notch 125 arranged on the top surface of the spark stand body 121, thereby serving as the spatial mask that partially obstructs the view (from the opening through the mounting flange 122) to the plasma cone 132.

Figure 6B:
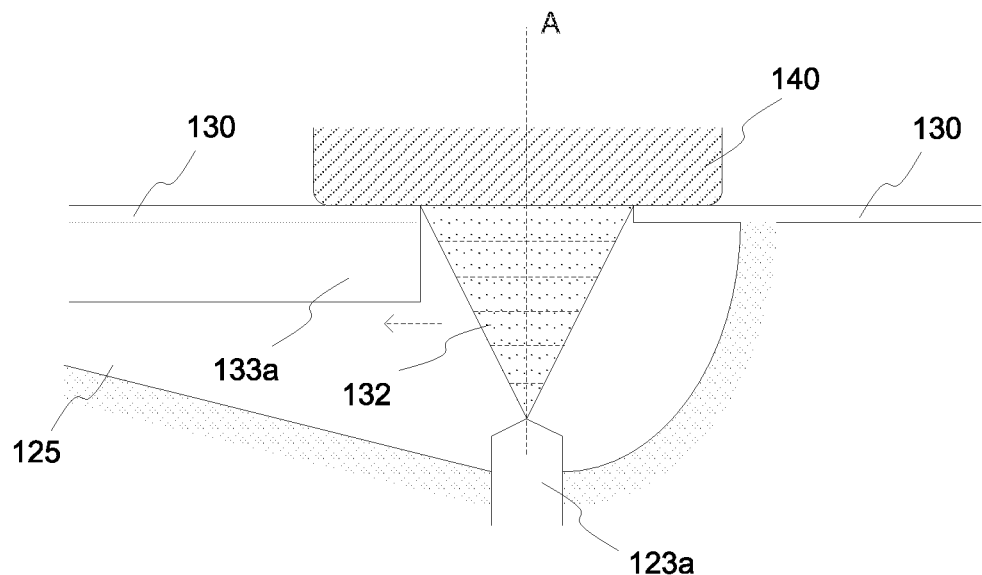
FIG. 6B schematically illustrates some details of a spark stand assembly according to an example.
Figure 6C:
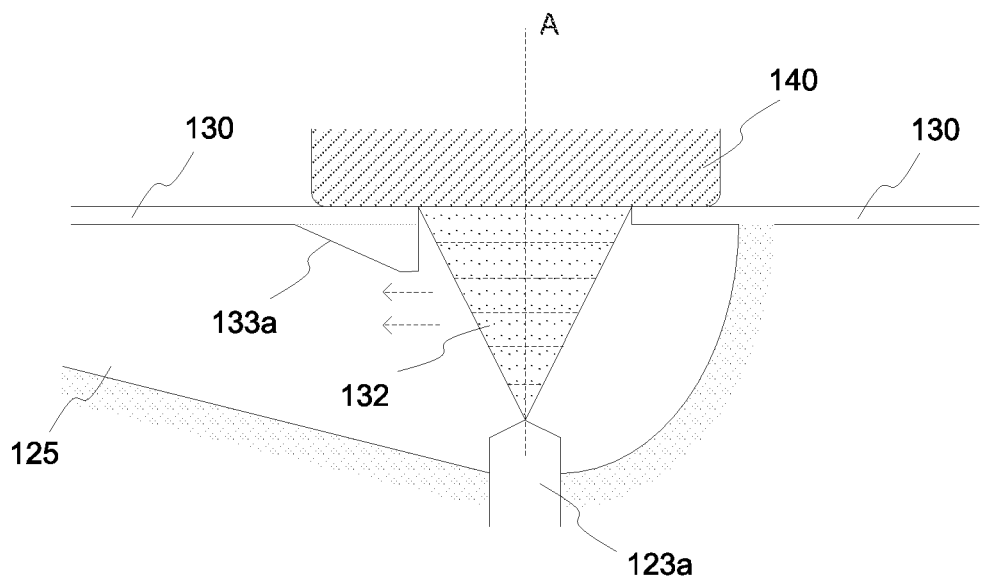
FIG. 6C schematically illustrates some details of a spark stand assembly according to an example.
Figure 6D:
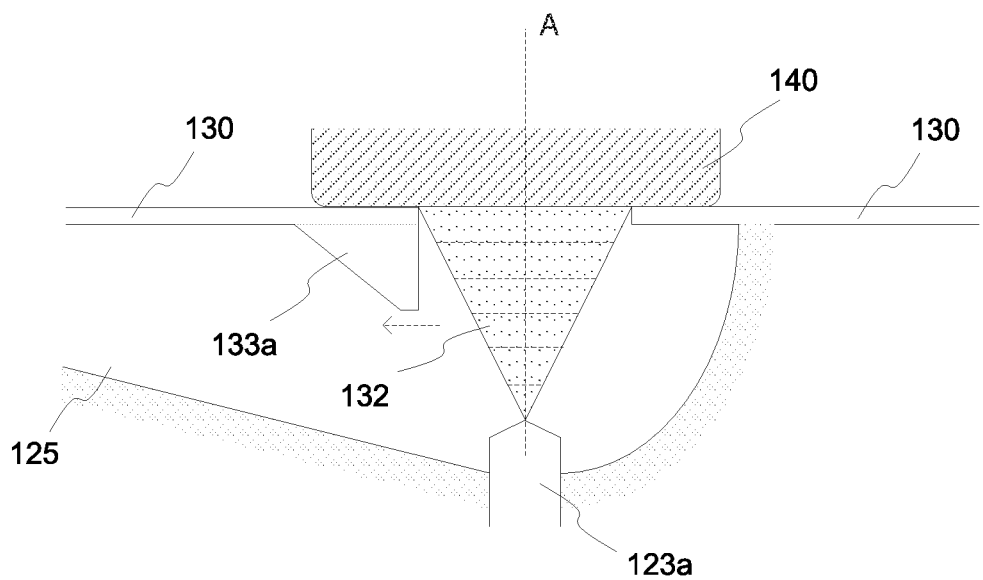
FIG. 6D schematically illustrates some details of a spark stand assembly according to an example.

FIG. 6B schematically illustrates the spatial mask provided as the masking portion 133a according to another example, where the masking portion 133a provides a higher masking height (or masking depth) in comparison to that of the example of FIG. 6A. FIGS. 6C and 6D schematically illustrate respective further examples of providing the spatial mask as the masking portion 133a at respective masking heights (or masking depths), where the masking portion 133a has a shape different from that of the respective examples of FIGS. 6A and 6B.

In an example, the spark stand assembly 120 may be provided with two or more spark stand plates, where the spark stand plate to be applied for a certain measurement may be chosen in view of (expected) characteristics of the sample 140 under study. As an example in this regard, the two or more spark stand plates may comprise a first spark stand plate provided without the spatial mask and a second spark stand plate provided with the spatial mask and, consequently, the first and second spark stand plates may be used interchangeably e.g. such that the second spark stand plate is applied for measurements where masking of the hottest portion of the plasma cone 132 is considered advantageous while the first spark stand plate 130 is applied for measurements where such masking is considered unnecessary or even disadvantageous. In a variation of this example, the two or more spark stand plates may comprise two or more second spark stand plates, each provided with a spatial mask having a masking height (or masking depth) that is different from respective masking heights (or masking depths) of the other ones of the two or more seconds spark stand plates.

In another example, the two or more spark stand plates of the spark stand assembly 120 may comprise a first spark stand plate provided with the spatial mask that provides a first masking height (or masking depth) and a second spark stand plate provided with a second spatial mask having a second masking height (or masking depth) that is different from the first masking height (or masking depth) of the first spark stand plate (e.g. according to respective examples of FIGS. 6A and 6B). As a non-limiting example, the first masking height (or masking depth) may be 25% and the second masking height (or masking depth) may be 50%. Consequently, the first and second spark stand plates may be used interchangeably e.g. such that the one of the first and second spark stand plates that provides a masking height (or masking depth) that is better suited for the measurement under consideration is chosen. In consideration of the example described above that involves different characteristic of the iron matrix samples and aluminum matrix samples, the first spark stand plate that provides 25% masking height (or masking depth) may be applied for measurement of iron matrix samples, whereas the second spark stand plate that provides 50% masking height (or masking depth) may be applied for measurement of aluminum matrix samples. In a variation of this example, the two or more spark stand plates may comprise three or more spark stand plates, each provided with a spatial mask having a masking height (or masking depth) that is different from respective masking heights (or masking depths) of the other ones of the three or more seconds spark stand plates.

Figure 6E:
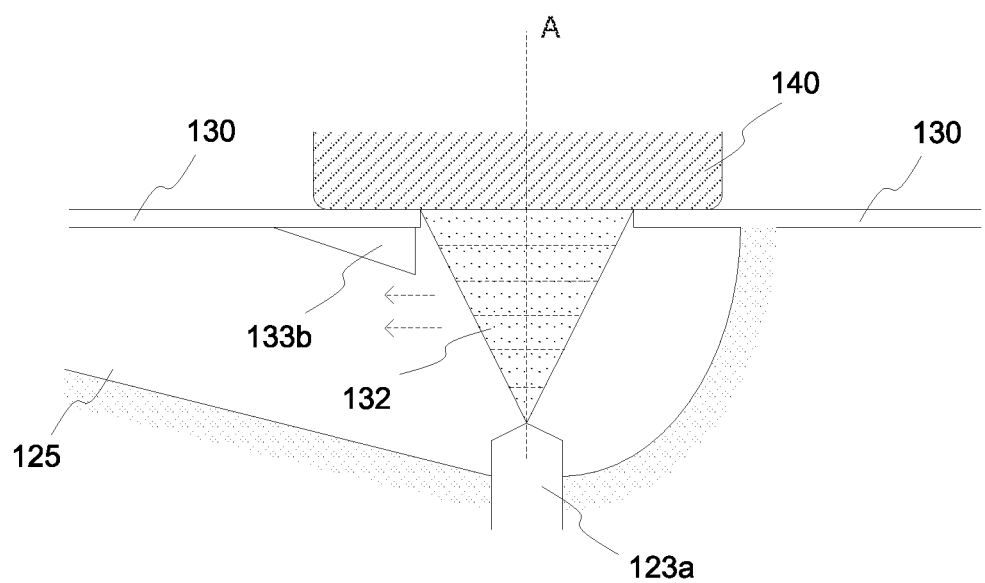
FIG. 6E schematically illustrates some details of a spark stand assembly according to an example.
Figure 6F:
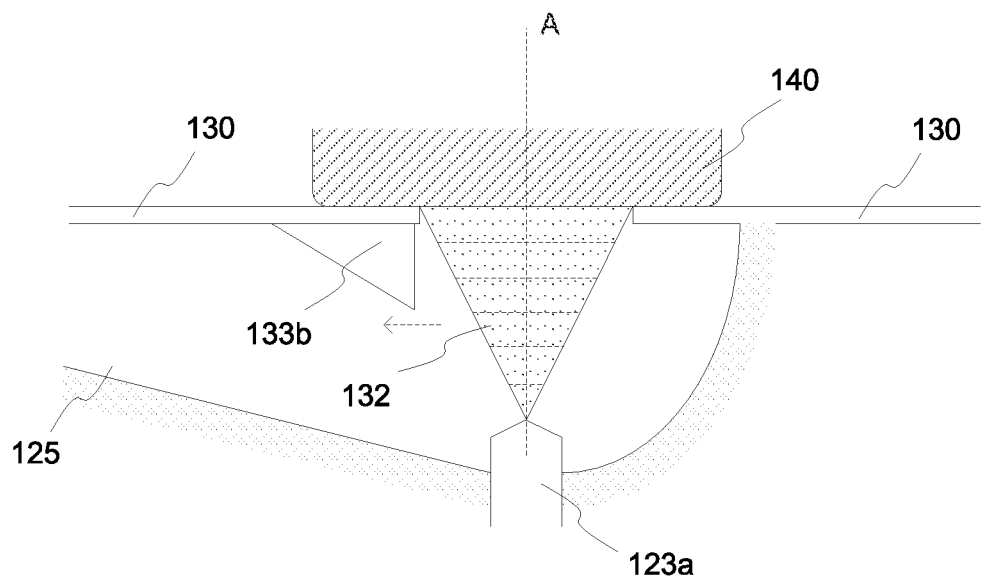
FIG. 6F schematically illustrates some details of a spark stand assembly according to an example.

As a further example of providing the spark stand plate 130 with the spatial mask, FIG. 6E schematically illustrates an example showing the spark stand plate 130 provided with a masking member 133b that is attached to the inner surface of the spark stand plate 130 in a portion of the spark stand plate 130 that spatially coincides with the notch 125 when the spark stand plate 130 is secured in its position on the spark stand body 121. Consequently, when placing the spark stand plate 130 on the top surface of the spark stand body 121, the masking member 133b that extends from the inner surface of the spark stand plate 130 may protrude into the notch 125 arranged on the top surface of the spark stand body 121, thereby serving as the spatial mask that partially obstructs the view (from the opening through the mounting flange 122) to the plasma cone 132. FIG. 6F schematically illustrates the spatial mask provided as the masking member 133b according to another example, where the masking member 133b provides a higher masking height (or masking depth) in comparison to that of the example of FIG. 6E.

In an example, the masking member 133b may be detachably attached to the inner surface of the spark stand plate 130. Consequently, the spark stand plate 130 may be applied with or without the masking member 133b serving as the spatial mask in accordance with the measurement under consideration. In a variation of this example, the spark stand assembly 120 may be provided with two or more masking members 133b (e.g. according to respective examples of FIGS. 6E and 6F), each providing a masking height (or masking depth) that is different from respective masking heights (or masking depths) of the other ones of the two or more masking members, thereby providing the user with the choice between using the spark stand plate without masking member 133b or with one of the two or more masking members 133b that provides the masking height (or masking depth) considered most appropriate for the measurement under consideration.

In the examples illustrated via FIGS. 6A to 6F, the spatial mask is provided at least at or immediately adjacent to the rim of the opening 131 through the spark stand plate 130. This is advantageous in that it allows for additional freedom in selecting the orientation of an entrance slit with respect to the center axis of the plasma cone 132, where the entrance slit may be applied as the entrance aperture to the spectrometer optics 114a: a spatial mask positioned at or immediately adjacent to the rim of the opening 131 ensures providing the desired spatial masking regardless of orientation of the entrance slit, including a scenario where the entrance slit is parallel or substantially parallel with the center axis of the plasma cone 132. In other examples, the spatial mask may be provided further away from the rim of the opening, basically in any position along the notch 125 between the recess and the mounting flange 122, whereas such positioning of the spatial mask may ensure the desired spatial masking in a scenario where the entrance slit is perpendicular or substantially perpendicular to the center axis of the plasma cone 132 while it may provide at least partially compromised masking performance for other entrance slit orientations.

The examples provided in the foregoing involve the sealing member groove 126 arranged on the top surface of the spark stand body 121 in order to facilitate providing the sealing ring 127 between the top surface of the spark stand body 121 and the spark stand plate 130 such that the sealing ring 127 encloses the recess and the elongated notch 125 arranged in the top surface and is routed over the elevated portion 124 provided on the top surface. In other examples, the sealing member groove 127 may be omitted from the top surface of the spark stand body 121 but the sealing member groove 126 may be arranged in the inner surface of the spark stand plate 130 instead. In such an approach the sealing member groove 127 may be positioned in the inner surface of the spark stand plate 130 such that the sealing member 127 at least partially embedded therein encloses the recess and the elongated notch 125 arranged in the top surface of the spark stand body 121 and is routed over the elevated portion 124 when the spark stand plate 131 is arranged into its position on the top surface of the spark stand body 121.

The examples provided in the foregoing assume detachable mounting of the spark stand assembly 120 to the main housing 110 of the OES instrument 100 via detachably attaching the mounting flange 122 to the mounting interface provided in the main housing 100. In other examples, the spark stand assembly 120 may be attached to the main housing 110 in a fixed manner, such that the correct spatial alignment between the second transmission path in the spark stand assembly 120 and the first transmission path in the main housing 110 is provided. In such a scenario the spark stand assembly 120 may be mounted via the mounting flange 122 to the mounting interface of the main housing 110 as part of manufacturing, installation or configuration process of the OES instrument 100, whereas subsequent dismounting of the spark stand assembly 120 by the user may not be provided for. Moreover, alternatively or additionally, mounting of the spark stand assembly 120 to the main housing 110 of the OES instrument 100 may be different from that illustrated in the schematic illustration of FIG. 1, e.g. such that the spark stand assembly 120 is attached on top of the main housing 110. In further examples, the spark stand assembly 120 may be at least partially embedded and/or integrated into the main housing 110 of the OES instrument 100.

The examples provided in the foregoing describe certain aspects concerning structure and characteristics of the spark stand assembly 120 according to the present disclosure, while on the other hand description omits many aspects of structure and/or operation that may be commonly applied for spark stands applied in context of OES instruments known in the art but that are not directly relevant for description of advantageous aspects of the spark stand assembly 120 according to the present disclosure in the interest of brevity and clarity of description. Examples of such aspects include gas inlet(s) to and draining outlet(s) from the plasma chamber and/or the notch 125 that may be provided to enable transferring the inert gas into the plasma chamber and out of the plasma chamber for creating the UV transmissive atmosphere within the plasma chamber and/or the notch 125 for carrying out the measurement, for purging of the plasma chamber and/or the notch 125 between measurements and/or for purging the portion of the sample 140 exposed via the opening 131 through the spark stand plate 130 upon carrying out the measurement. In this regard, the spark stand body 121 may be provided with one or more gas inlets for injecting inert gas (such as argon) into the plasma chamber for purging and one or more draining outlets for removing the inert gas and any debris formed during plasma generation out of the plasma chamber. Moreover, the spark stand assembly 120 may further comprise respective arrangements for injecting the inert gas via the one or more gas inlets into the plasma chamber and/or the notch 125 and for receiving the inert gas and the debris via the one or more draining outlets from the plasma chamber and/or the notch 125.

While the examples provided in the foregoing describe the structure and characteristics of the OES instrument 100 with at least implicit references to spark OES analysis, the examples provided in the present disclosure readily generalize into application in analysis instruments making use of a different OES technique, such as arc OES or laser-induced breakdown spectroscopy (LIBS), mutatis mutandis.

The invention claimed is:

1. A spark stand assembly for an optical emission spectroscopy, OES, instrument, the spark stand assembly comprising:
   a spark stand body attached to a mounting flange that enables attaching the spark stand assembly to a main housing of the OES instrument;
   an exciter disposed into a recess arranged on a top surface of the spark stand body;
   an elevated portion arranged on the top surface of the spark stand body adjacent to the mounting flange;
   an elongated notch arranged on the top surface of the spark stand body and connecting said recess to a passageway through the elevated portion;
   a spark stand plate that is detachably attachable on the top surface of the spark stand body to cover said recess, said notch and at least part of the elevated portion such that said recess forms a plasma chamber and said notch forms a part of an optical transmission path from the plasma chamber to said passageway, wherein the spark stand plate comprises an opening therethrough for exposing a part of a sample positioned on the opening for excitation from the exciter, said opening positioned such that said opening is spatially aligned with the exciter when the spark stand d plate is attached on the top surface of the spark stand body, and
   a sealing member arranged between the top surface of the spark stand body and the spark stand plate such that the sealing member encloses said recess and said notch and is routed over the elevated portion,
   wherein the elongated notch connects said recess to an opening through the mounting flange via said passageway through the elevated portion and wherein the elongated notch has a depth that steadily decreases from a first end of the notch at said recess to a second end of the notch at the passageway through the elevated portion.

2. The spark stand assembly according to claim 1, comprising a sealing member groove arranged on the top surface of the spark stand body and on the elevated portion such that it encloses said recess and said notch, wherein the sealing member is at least partially embedded into the sealing member groove.

3. The spark stand assembly according to claim 1, comprising a sealing member groove arranged on a spark stand body facing surface of the spark stand plate, wherein the sealing member is at least partially embedded into the sealing member groove and wherein the sealing member groove is positioned such that the sealing member encloses said recess and said notch and is routed over the elevated portion when the spark stand plate is attached on the top surface of the spark stand body.

4. The spark stand assembly according to claim 1, where the spark stand plate is attachable on the top surface of the spark stand body via pressing the spark stand plate against the top surface of the spark stand body.

5. The spark stand assembly according to claim 4, comprising an attachment mechanism arranged for pressing the spark stand plate against the top surface of the spark stand body.

6. The spark stand assembly according to claim 5, wherein the attachment mechanism comprises a set of clamps for pressing the spark stand plate against the top surface of the spark stand body.

7. The spark stand assembly according to claim 1, wherein a spark stand body facing surface of the spark stand plate has a shape that substantially follows the shape of the top surface of the spark stand body apart from said recess and said notch.

8. The spark stand assembly according to claim 7, wherein
the top surface of the spark stand body is substantially planar apart from said recess, said notch and said elevated portion, and
the spark stand body facing surface of the spark stand plate is substantially planar apart from a portion that is intended for abutting the elevated portion.

9. The spark stand assembly according to claim 1, wherein said optical transmission path comprises a coupling lens or a window for isolating at least part of said optical path from the plasma chamber.

10. The spark stand assembly according to claim 1, wherein the exciter comprises an electrode arranged to generate spark excitation for transforming a fraction of the sample into a plasma state, thereby generating a plasma cone between a tip of the electrode and the surface of the sample upon activation of the electrode.

11. The spark stand assembly according to claim 3, wherein the spark stand plate comprises a spatial mask that protrudes from the spark stand body facing surface of the spark stand plate, arranged in a position that spatially coincides with the notch when the spark stand plate is attached on the top surface of the spark stand body, the spatial mask thereby partially obstructing said optical transmission path from the plasma chamber to said passageway.

12. The spark stand assembly according to claim 11, wherein the spatial mask comprises a masking portion provided as a thickened portion of the spark stand plate that protrudes into the notch when the spark stand plate is attached on the top surface of the spark stand body.

13. The spark stand assembly according to claim 11, wherein the spatial mask comprises a masking member detachably attached to the spark stand plate, where the masking member protrudes into the notch when the spark stand plate is attached on the top surface of the spark stand body.

14. The spark stand assembly according to claim 11, wherein the height of the spatial mask measured from an outer surface of the spark stand plate is between 25 and 70% of the distance between a tip of the exciter and the outer surface of the spark stand plate.

15. An optical emission spectroscopy, OES, instrument comprising a main housing and the spark stand assembly according to claim 1, wherein
the main housing comprises an optical spectrometer assembly and a mounting interface for attaching the spark stand assembly to the main housing, and
the mounting interface comprises an optical interface for connecting said optical transmission path of the spark stand assembly to the spectrometer assembly.

16. The spark stand assembly according to claim 2, where the spark stand plate is attachable on the top surface of the spark stand body via pressing the spark stand plate against the top surface of the spark stand body.

17. The spark stand assembly according to claim 3, where the spark stand plate is attachable on the top surface of the spark stand body via pressing the spark stand plate against the top surface of the spark stand body.

18. The spark stand assembly according to claim 2, wherein a spark stand body facing surface of the spark stand plate has a shape that substantially follows the shape of the top surface of the spark stand body apart from said recess and said notch.

19. The spark stand assembly according to claim 3, wherein the spark stand body facing surface of the spark stand plate has a shape that substantially follows the shape of the top surface of the spark stand body apart from said recess and said notch.

20. The spark stand assembly according to claim 4, wherein a spark stand body facing surface of the spark stand plate has a shape that substantially follows the shape of the top surface of the spark stand body apart from said recess and said notch.

* * * * *